US010281933B2

(12) United States Patent
Pena et al.

(10) Patent No.: US 10,281,933 B2
(45) Date of Patent: May 7, 2019

(54) ADAPTIVE PRESSURE BALANCER

(71) Applicant: iDive, Inc., San Diego, CA (US)

(72) Inventors: James Pena, San Diego, CA (US); Michael Berumen, Thuwal (SA); Wai Man Victor Tsui, Shenzhen (CN)

(73) Assignee: iDive, Inc., San Diego, CA (US)

( * ) Notice: Subject to any disclaimer, the term of this patent is extended or adjusted under 35 U.S.C. 154(b) by 0 days.

(21) Appl. No.: 15/178,371

(22) Filed: Jun. 9, 2016

(65) Prior Publication Data

US 2016/0357197 A1 Dec. 8, 2016

Related U.S. Application Data

(63) Continuation of application No. PCT/US2014/069098, filed on Dec. 8, 2014.
(Continued)

(51) Int. Cl.
*G05D 16/06* (2006.01)
*A45C 11/22* (2006.01)
*F16K 17/02* (2006.01)
*F17C 1/00* (2006.01)
*A45C 11/00* (2006.01)

(52) U.S. Cl.
CPC .......... *G05D 16/0602* (2013.01); *A45C 11/22* (2013.01); *F16K 17/02* (2013.01); *F17C 1/005* (2013.01); *G05D 16/0633* (2013.01); *G05D 16/0636* (2013.01); *A45C 2011/001* (2013.01); *A45C 2011/002* (2013.01);
(Continued)

(58) Field of Classification Search
CPC ......... A45C 2011/001; G05D 16/0602; G05D 16/0633; G05D 16/0636

USPC .............. 137/81.1, 81.2; 396/25, 26
See application file for complete search history.

(56) References Cited

U.S. PATENT DOCUMENTS 4,312,580 A * 1/1982 Schwomma ........... G03B 17/08
340/605
4,853,722 A 8/1989 Gell, Jr.
(Continued)

OTHER PUBLICATIONS

PCT International Search Report of PCT/US14/69098 dated Feb. 26, 2015; (2 pgs.).
(Continued)

*Primary Examiner* — Marina A Tietjen
*Assistant Examiner* — Paul J Gray
(74) *Attorney, Agent, or Firm* — DLA Piper LLP (US)

(57) ABSTRACT

Pressure balancing apparatuses and methods disclosed here include embodiments with a waterproof enclosure having walls surrounding an interior chamber, a mounting interface mounted to the enclosure with a port to an outside, and a balancing module, connected to the mounting interface, the balancing module including, a balancing module housing, a valve actuator member inside the balancing module housing, with a receptacle for a pressure source. In certain embodiments the valve actuator member is configured to move in response to changes in differential pressure between a pressure in the enclosure chamber and pressure from the outside, and a module valve, inside the balancing module housing, connected to the valve actuator member, and fluidically separating the enclosure chamber from the port to the outside, wherein the module valve is configured to open and close in response to the movement of the valve actuator member.

18 Claims, 14 Drawing Sheets

Related U.S. Application Data

(60) Provisional application No. 61/913,869, filed on Dec. 9, 2013.

(52) U.S. Cl.
CPC . *A45C 2011/003* (2013.01); *F17C 2201/0109* (2013.01); *F17C 2221/03* (2013.01)

(56) References Cited

U.S. PATENT DOCUMENTS

| | | | |
|---|---|---|---|
| 7,021,330 B2 * | 4/2006 | Maula | F16K 7/14 |
| | | | 137/341 |
| 8,464,745 B1 | 6/2013 | Ringer | |
| 2012/0008928 A1 * | 1/2012 | Ghali | G03B 17/08 |
| | | | 396/27 |
| 2013/0025904 A1 * | 1/2013 | Berumen | G06F 1/1626 |
| | | | 174/50.5 |

OTHER PUBLICATIONS

PCT Written Opinion of the International Searching Authority of PCT/US14/69098 dated Feb. 26, 2015; (12 pgs.).
PCT International Preliminary Report on Patentability of PCT/US14/69098 dated Jun. 14, 2016; (1 pg.).

* cited by examiner

ADAPTIVE PRESSURE BALANCER

RELATED APPLICATIONS

This application claims priority from and is a continuation of international PCT patent application PCT/US14/69098 filed 8 Dec. 2014, which claims priority to U.S. Provisional Application 61/913,869 entitled "APPARATUS ENHANCING DEPTH LIMITS OF ANCILLARY EQUIPMENT ENCLOSURES," filed on 9 Dec. 2013, which are incorporated herein by reference.

TECHNICAL FIELD

The disclosure here concerns pressure regulation and pressure balancing including but not limited to an underwater diving apparatus and waterproof enclosures.

BACKGROUND

Ancillary diving equipment includes devices such as still and motion imaging cameras, lights for underwater illumination, underwater communication equipment, computers and various other electronic devices that are adapted for underwater use. This equipment may be rated according to a maximum acceptable depth of a dive. Some of these devices are limited to underwater use and therefore tend to be limited in variety and expensive because the cost of making such devices can only be amortized over use in diving.

Waterproof enclosures have been designed to enable electronics and cameras to be used underwater that are not specifically adapted for diving. Such electronics include mobile devices such as tablet computers and hand-held "smart phones." Relatively low cost plastic enclosures can be utilized for moderate depths. More expensive metal-reinforced and thick-walled enclosures are needed for greater dive depths. The latter tend to be heavy and expensive. Also when using tablet computers there is a desire for a user to be able to access the touch screen underwater. These considerations create a desire for newer underwater enclosure systems for electronics and cameras.

SUMMARY

Embodiments disclosed here include systems and methods for pressure balancing. In certain embodiments, this includes a waterproof enclosure having walls surrounding an interior chamber, a mounting interface mounted to the enclosure with a port to an outside, and a balancing module, connected to the mounting interface, the balancing module including, a balancing module housing, a valve actuator member inside the balancing module housing, with a receptacle for a pressure source. In some embodiments the valve actuator member is configured to move in response to changes in differential pressure between a pressure in the enclosure chamber and pressure from the outside, and a module valve, inside the balancing module housing, connected to the valve actuator member, and fluidically separating the enclosure chamber from the port to the outside, wherein the module valve is configured to open and close in response to the movement of the valve actuator member. IN certain embodiments, one of the walls includes a clear membrane.

Some embodiments may further comprise a pressure regulator connected to the mounting interface, the pressure regulator configured to, open when pressure in the outside drops, and close when pressure in the outside increases. Certain embodiments may have the mounting interface include a gas coupling conduit between the balancing module and the waterproof enclosure interior chamber. In some embodiments the receptacle for the pressure source is a gas coupling conduit and valve assembly between the enclosure interior chamber and the pressure source. And in some, a button connected to the valve actuator member configured to open the valve assembly. Certain embodiments may have the pressure source as a carbon dioxide cartridge and in some an external oxygen dive tank.

Systems and methods here include embodiments of pressure balancing. Certain embodiments include connecting a balancing mechanism housing to a valve actuator member, the balancing mechanism housing including a closed channel, and the valve actuator member, including an axial portion having a first end and a second end, and, a radially extending pressure receiving portion 38 with an open radial channel. In some embodiments, the first end of the axial portion is a valve actuator, and in some, the second end of the axial portion is in communication with a button. Also, embodiments may include attaching the valve actuator member, to the balancing mechanism housing via a first and a second flexible diaphragm, coupling the pressure receiving portion open radial channel to the balancing mechanism housing via the first flexible diaphragm, and coupling the axial portion to the balancing mechanism housing via the second flexible diaphragm. In some embodiments, biasing the valve actuating member toward the first end of the axial portion via a spring between the balancing mechanism housing and the pressure receiving portion.

In certain embodiments, the first and second diaphragms are made of at least one of, rubber and plastic. And some embodiments further comprise mounting a mounting interface mounted to a waterproof enclosure having walls surrounding an interior chamber, with one wall including a clear membrane, the mounting interface having a port to an outside, connecting a balancing module containing the balancing mechanism to the mounting interface. In certain embodiments the balancing module includes a receptacle for a pressure source. And some embodiments further comprise allowing the valve actuator member to move in response to changes in differential pressure between a pressure in the enclosure chamber and pressure from the outside. Further, some embodiments further comprise allowing a module valve to open and close in response to the movement of the valve actuator member.

Certain aspects may include a pressure balancing apparatus and method for balancing a differential pressure between an enclosed chamber of a diving equipment enclosure relative to a surrounding water environment including a mounting interface portion for mechanically mounting the pressure balancing apparatus to the enclosure, and a balancing module including a valve actuator member that moves in response to changes in the differential pressure between the pressure in the enclosure chamber and a water environment pressure and a module valve that fluidically separates the enclosure chamber from a pressure source, the module valve opens and closes in response to the movement of the valve actuator to maintain the differential pressure to a level greater than a first predetermined threshold during a dive descent but remains closed during a dive ascent without manual activation by a diver.

Some aspects include a pressure balancing apparatus for balancing a differential pressure between an enclosed chamber of a diving equipment enclosure and a surrounding water environment including a mounting interface portion for mechanically mounting the pressure balancing apparatus to the enclosure, the mounting interface enclosure defining a gas coupling port for pressure communication coupling with the enclosure chamber and a water inlet port for pressure communication coupling to the water environment, a balancing module including a valve actuator member including an axial portion extending along a first axis and including a valve actuating portion at a first end and a pressure receiving portion extending radially from the axial portion, the pressure receiving portion defining two opposing surfaces including a first surface and a second surface, the first surface in pressure communication with the gas coupling port and the second surface in pressure communication with the water inlet, the valve actuator member moves along the first axis in axis in response to a differential pressure between the two opposing surfaces reaching a first threshold, a spring that urges the valve actuator along the first axis and partially defining the first threshold and a valve that opens and closes in response to the movement of the valve actuating member to maintain a differential pressure between the enclosure chamber and the water environment above the first threshold.

Some aspects include a pressure balancing apparatus for regulating a pressure within an enclosed chamber of a diving equipment enclosure to be utilized in a water environment including an interface portion including a gas coupling port for pressure communication with the enclosure chamber, a balancing module defining a first chamber in pressure communication with the enclosure chamber and a second chamber in pressure communication with the water environment, the balancing module including, a balancing mechanism housing, an actuator member having an axial portion and a pressure receiving portion, the pressure receiving portion including an first surface in pressure communication with the enclosure chamber and a second surface in pressure communication with the water environment, the axial portion including a valve actuating portion of the actuator member, a valve configured to be opened and closed by vertical motion of the valve actuating portion of the actuator member, opening the valve connects a pressure source to the first chamber, and one or more diaphragms that couple the actuator member to the regulator housing and allowing movement of the actuator member with small enough forces to accurately control a pressure difference between the enclosure chamber and the water environment.

BRIEF DESCRIPTION OF THE FIGURES

For a better understanding of the technology described in this document as well as any embodiments thereof, reference should be made to the description below, in conjunction with the following figures in which like reference numerals refer to corresponding parts throughout the figures.

DETAILED DESCRIPTION

Figure 1:
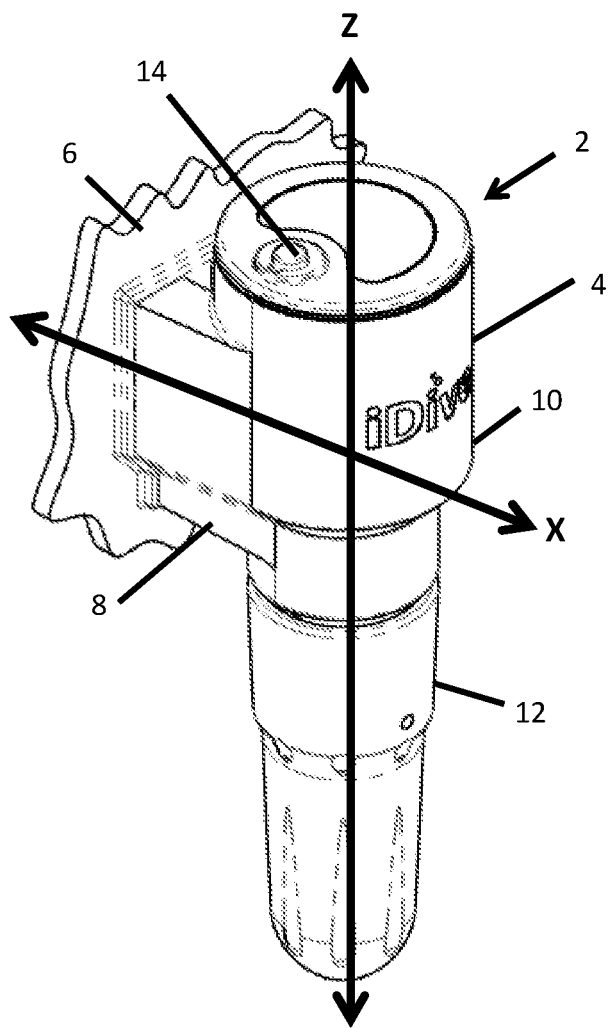
FIG. 1 is an example frontward isometric view of a pressure balancing apparatus assembled to an enclosure, according to certain embodiments.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

The disclosure here concerns a pressure balancing apparatus and associated methods, configured in certain embodiments, to be used with an enclosure holding ancillary dive equipment such as still and motion imaging cameras, lights for underwater illumination, underwater communication equipment, computers and any of various other devices, including electronic devices. The enclosure could be made of any of various materials including but not limited to plastics, ceramics, composites, metals, fiberglass, or any other type material. In some embodiments, interaction with whatever is placed into the enclosure is enabled by various features. For example, certain embodiments include allow a touch screen interface of a tablet computer or smartphone to be used at a wide range of diving depths.

Additionally, certain examples include enclosures that can withstand pressure increases as such an apparatus may experience at varying depths of water or liquid. It should be noted that the example of a diver using the systems and methods here underwater at varying depths and pressures is merely illustrative and not intended to be limiting in any way.

Pressure Examples

Certain example embodiments here may be used to regulate pressures between an enclosure and the surrounding environment that the enclosure is placed in. To regulate such pressure, various valve arrangements may be used, as described below. Such example environments could be low pressure environments such as those experienced in the upper earth atmosphere, or higher pressure environments as those experienced below sea level and underwater. As such, in certain examples, the "differential pressure" may be the internal gas pressure within the enclosure chamber minus the water pressure of the surrounding water environment. So, for example, as the enclosure is moved into an environment with increasing water depths, for example, the pressure balancing example embodiments can causes the pressure within the enclosure to automatically rise to maintain the differential pressure to within a first narrow band of values that is at or above a first pressure threshold.

As the enclosure is transported upward toward decreasing water depths, the gas inside the enclosure may be automatically released from the enclosure into the water environment in order to maintain the differential pressure to within a second narrow band of values that is below a second pressure threshold.

In an exemplary embodiment the second pressure threshold is greater than the first pressure threshold. In an exemplary embodiment the first (differential) pressure threshold is negative and the second (differential) pressure threshold is positive.

Physical Structure Examples

In some embodiments the pressure balancing apparatus includes two mechanical devices including a pressure balancing module and a pressure regulator. Certain embodiments may include only mechanical and no electronic controls for closed loop pressure control.

Examples of pressure balancing modules include a valve actuator member and a module valve. The valve actuator member is configured to move in response to sufficient changes in the differential pressure. The module valve is configured to open and close in response to movement of the valve actuator to maintain the differential pressure to a level greater than the first pressure threshold during a dive descent but remain closed during a dive ascent absent manual user intervention to open the module valve.

In an exemplary embodiment the pressure regulator includes a check valve that opens and releases gas from the enclosure chamber during a dive ascent to maintain the differential pressure to a level less than the second pressure threshold. The check valve is configured to remain closed during a dive descent absent manual user intervention to open the module valve.

In certain embodiments the pressure balancing examples include a button or other mechanical feature configured to allow a diver to manually activate or open the module valve. In such examples, depressing the button opens the module valve and allows the pressure source to release gas into the enclosure chamber. Further, the check valve may open to prevent the differential pressure from rising above the second pressure threshold during the manual activation of the module valve. Thus, during manual activation of the check valve it is possible that both the module valve and the check valve may be open at the same time.

In certain example embodiments the differential pressure is negative during a dive descent. For example, the differential pressure may be maintained above negative 10 PSI (pounds per square inch) or in some examples, above negative 5 PSI or in some examples above negative 2 PSI during a dive descent.

Certain embodiments allow for manipulation of the differential pressure by using a button configured to increase the differential pressure to a slightly positive value. In some embodiments the positive value is in the range of 0.1 to 2 PSI. For some applications it is desirable to maintain the pressure in the range of 0.1 to 0.5 PSI. Other pressure threshold values are potentially possible with this design as required or preferred by a particular application.

Physical Structure Examples

FIG. 1 is an example isometric view of an exemplary pressure balancing apparatus 2 according to certain embodiments herein. In this example, pressure balancing apparatus 2 includes an outer housing 4 that is mounted to an enclosure 6 via interface portion 8. Only a small portion of enclosure 6 is shown for illustrative purposes. The enclosure could be any number of various enclosures to fit any number of devices including but not limited to computers, smartphones, tablets, cameras, or other device.

Interface portion 8 provides various functions including but not limited to, mechanical structural support of the pressure balancing apparatus 2 to the enclosure 6 and providing a gas coupling port that fluidically couples a regulated pressure source within housing 4 with an interior of enclosure 6. In certain exemplary embodiments, interface 8 also provides a pressure regulator that prevents pressure within enclosure 6 from exceeding a preselected value. In some exemplary embodiments, interface 8 provides a fluid inlet that couples the water environment to a regulator mechanism residing within regulator apparatus 2.

In certain exemplary embodiments, housing 4 includes an upper portion 10 and a lower portion 12. Upper portion 10 includes a pressure balancing mechanism. Lower portion 12 is removable from upper portion 10 such as via a threaded mount, i.e., lower portion 12 may be uncoupled from upper portion 10. A threaded screw type coupling may be used, or any of other various coupling including but not limited to a friction fit coupling, a snap, strap, buckle, click, or other type coupling. Lower portion 12 can be configured to contain a replaceable pressure source such that pressure balancing apparatus 2 has a self-contained pressure source 22. In some embodiments an external pressure source 22 is used and lower housing 12 is not required or is modified to adapt to the external pressure source.

According to an exemplary embodiment of pressure balancing apparatus 2, the upper portion 10 of housing 4 contains a pressure balancing mechanism 24 (embodiments depicted in more detail in FIGS. 4B, 5A, 5B, and 6) and a pressure source interface portion 27 that includes a module valve 28 and other components for interfacing with a pressure source 22. A first embodiment 27A of interface portion 27 is configured to interface with a pressurized cartridge 22 contained within the lower portion 12 of housing 4 (depicted in FIGS. 5A and 8 for example). In some example embodiments, the pressurized cartridge is a carbon dioxide (CO2) cartridge which fits into the housing 4. A second embodiment 27B of interface portion 27 is configured to interface with a pressure source that is not internal to housing 4 (depicted in FIG. 5B for example). Any of various external pressure sources could be used, for example but not limited to a SCUBA dive tank and line and regulator.

The combination of pressure balancing mechanism 24 and interface portion 27 may be referred to as a balancing module 11.

In an exemplary embodiment balancing apparatus 2 includes a button 14 configured to be user manipulated to allow a user to release pressure from the pressure source 22 into the interior of enclosure 6, described in more detail below.

FIG. 1 also defines a vertical direction Z that is aligned with a vertical axis of pressure balancing apparatus 2 and a horizontal direction X that is perpendicular to Z. Vertical direction Z and horizontal direction Z are only relative designations for purposes of illustration and neither is necessarily aligned with or perpendicular to a gravitational direction. Outer housing 4 generally extends along axis Z and has its longest axis along Z. The interface 8 extends along axis X from outer housing 4 to enclosure 6.

Figure 2:
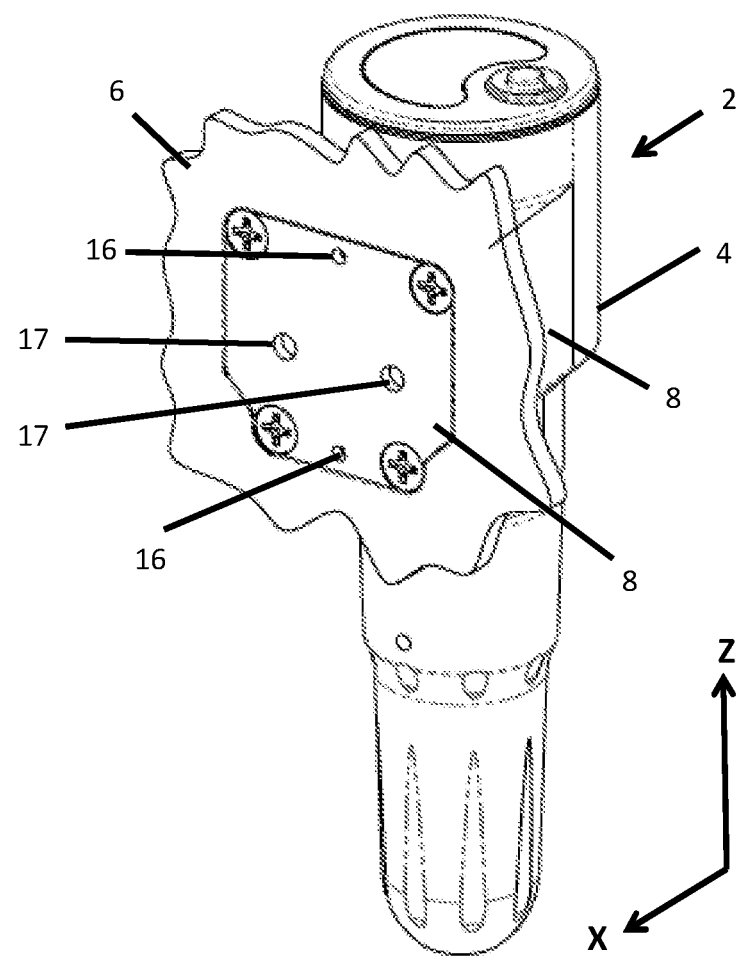
FIG. 2 is an example rearward isometric view of a pressure balancing apparatus assembled to an enclosure, according to certain embodiments.

FIG. 2 is an example isometric view of an exemplary pressure balancing apparatus 2 depicting mechanical attachment of housing 4 to enclosure 6 utilizing interface portion 8. Interface portion 8 defines gas coupling conduits or ports 16 that couple an interior chamber of enclosure 6 to a regulator mechanism within housing 4. Interface portion 8 also defines gas release ports 17 that couple the interior of enclosure 16 to check valves that open when the differential pressure exceeds a preset threshold.

Examples of Internal Details

Figure 3:
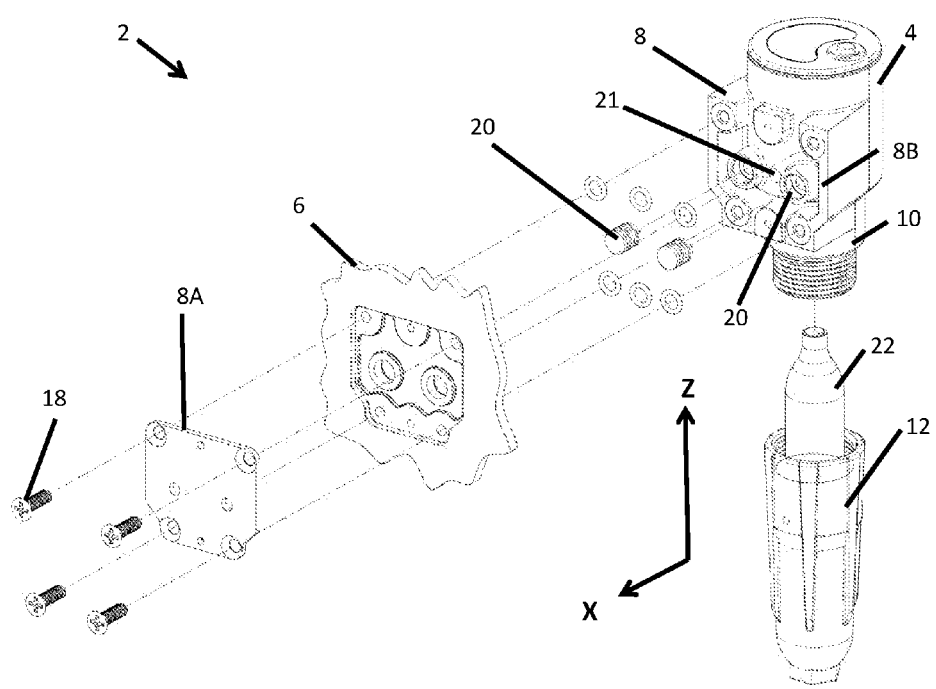
FIG. 3 is an example rearward exploded isometric view of a pressure balancing apparatus assembled to an enclosure, according to certain embodiments.

FIG. 3 is an example isometric exploded view of pressure balancing apparatus 2 to illustrate various components and their assembly. The interface portion 8 (indicated in FIG. 2) includes a plate 8A portion and receiving portion 8B to secure housing 4 to enclosure 6 using screws 18.

Interface portion 8 includes a pressure regulator 20 which may be a check valve 20 to prevent the differential pressure from rising above a predetermined pressure threshold. When check valve 20 opens it fluidically couples the interior of enclosure 6 to the surrounding water environment so that gas can escape from the interior of enclosure 6. Check valve 20 has a crack pressure that defines the maximum positive differential pressure within enclosure 6 (the second predetermined pressure threshold). In certain exemplary embodiments there are more than one check valves 20 to improve reliability through redundancy. Interface portion 8 also includes a fluid inlet 21 that fluidically communicates between the water environment and the pressure balancing mechanism 24 (FIG. 4B) that is internal to housing 4.

Certain example embodiments of pressure balancing apparatus 2 does not include pressure regulator 20. In such embodiments, the pressure regulator 20 can be separately mounted to enclosure 6 or can be formed as an integral portion of enclosure 6 that is separate from pressure balancing apparatus 2.

FIG. 3 also depicts an example lower portion 12 uncoupled and lowered from upper portion 10 of housing 4 to enable a self-contained pressure source 22 to be installed or removed from housing 4. In the exemplary embodiment shown in FIG. 3, pressure source 22 is a disposable CO2 (carbon dioxide) cartridge. In some embodiments, a tube carrying gas from an external pressurized source 22 can be attached to upper portion 10 of housing 4. An external pressurized source 22 can be a dive air tank.

Figure 4A:
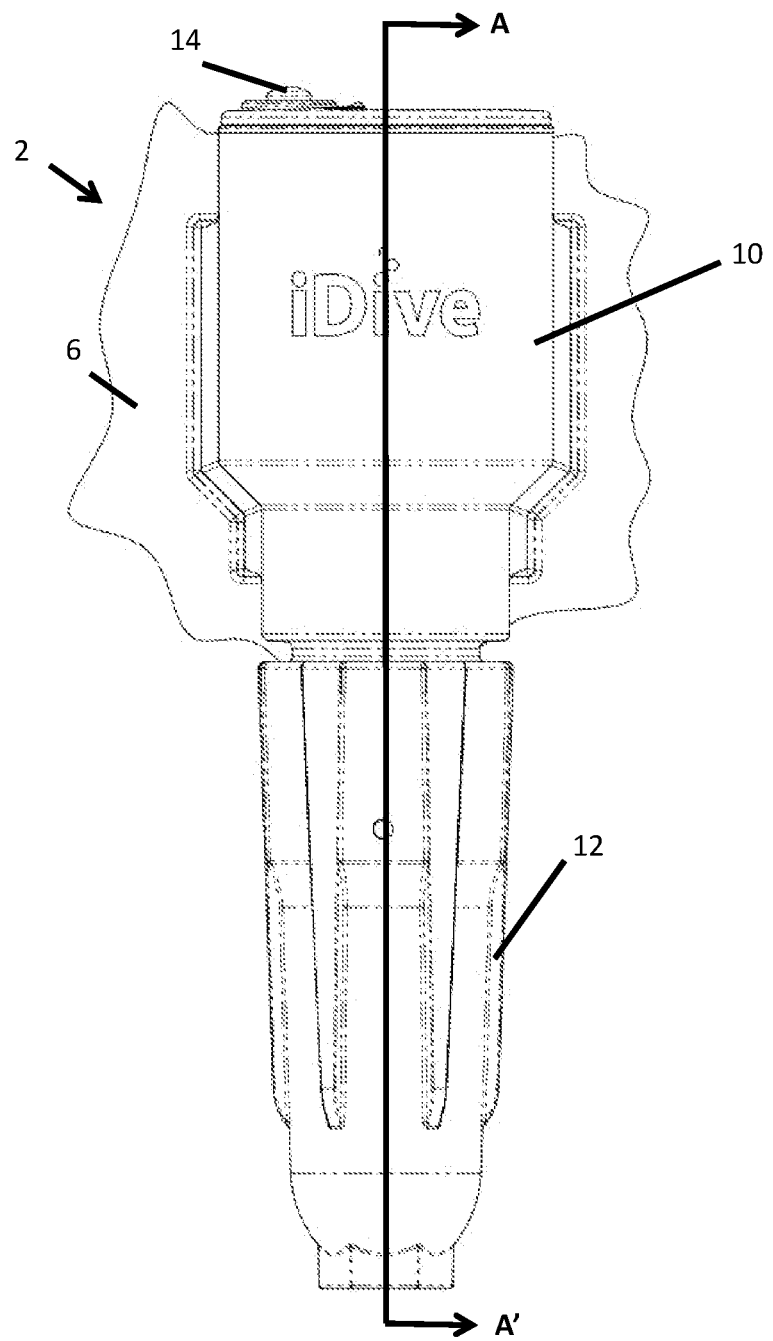
FIG. 4A is an example front view of a pressure balancing apparatus assembled to an enclosure, according to certain embodiments.
Figure 4B:
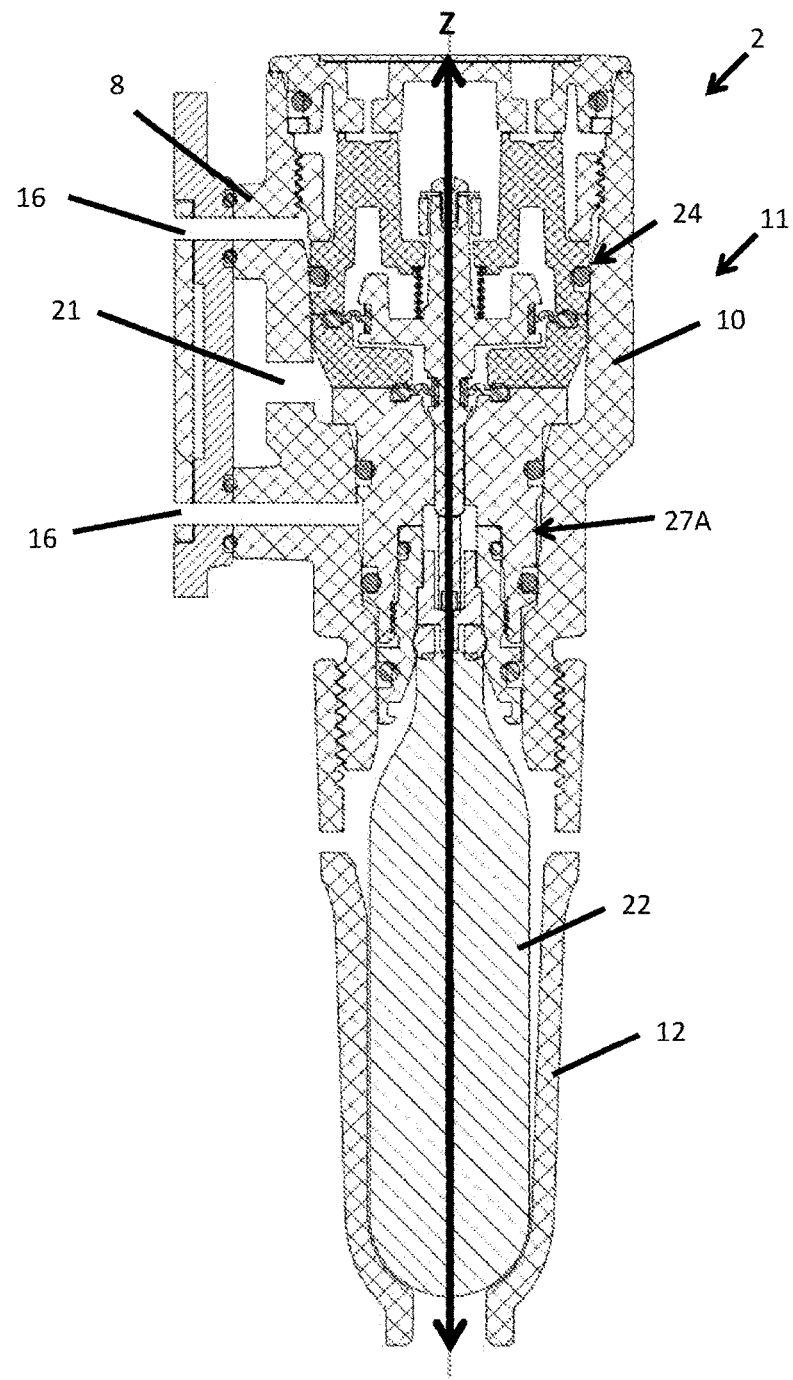
FIG. 4B is an example cross sectional view taken from AA' of FIG. 4A, according to certain embodiments.

FIG. 4A depicts an example view of pressure balancing apparatus 2 assembled to enclosure 6. FIG. 4B depicts a section AA' taken from FIG. 4A. FIG. 4A in cross-sectional view form. Lower portion 12 of housing 4 is illustrated as containing pressure source 22, e.g., a CO2 cartridge. Upper portion 10 of housing 4 is illustrated as containing a pressure balancing mechanism 24 for regulating pressure within enclosure 6 utilizing the pressure source 22. Balancing mechanism 24 is responsive to a differential pressure between a pressure within gas coupling ports 16 and a pressure received by fluid inlet 21.

Figure 5A:
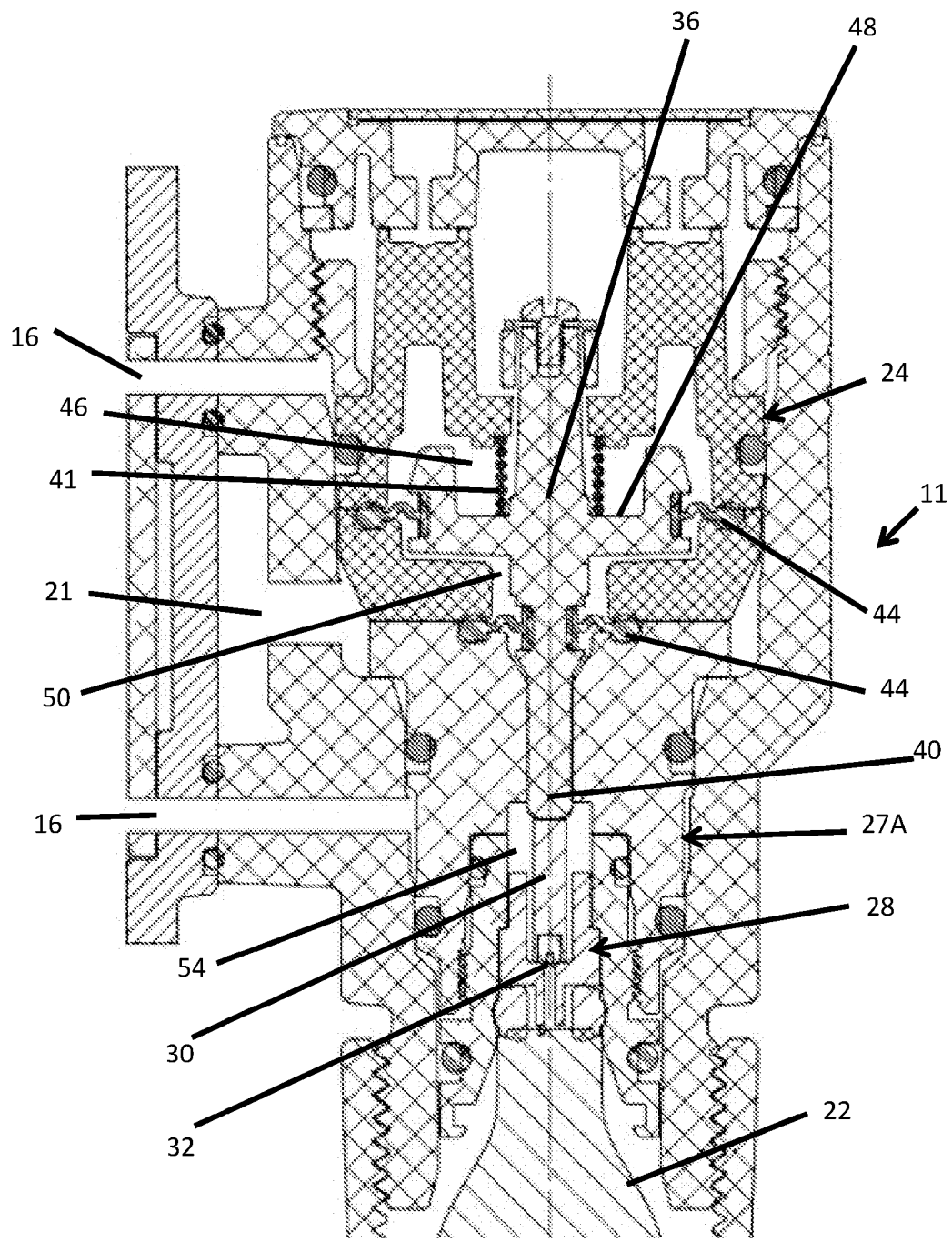
FIG. 5A is an example detailed portion of the cross sectional view of FIG. 4B, according to certain embodiments.

FIG. 5A depicts an example enlargement of a portion of FIG. 4B in order to further illustrate the balancing mechanism 24 and pressure source interface portion 27. As explained above, pressure source interface portion 27 is shown in different figures with different embodiments including one interface portion 27A for use with a self-contained pressure source 22 and one interface portion 27B (in the example in FIG. 5B) for use with a separate (not self-contained) pressure source 22. The example interface portion 27A depicted in FIG. 5A is configured for use with the self-contained pressure source 22.

Figure 5B:
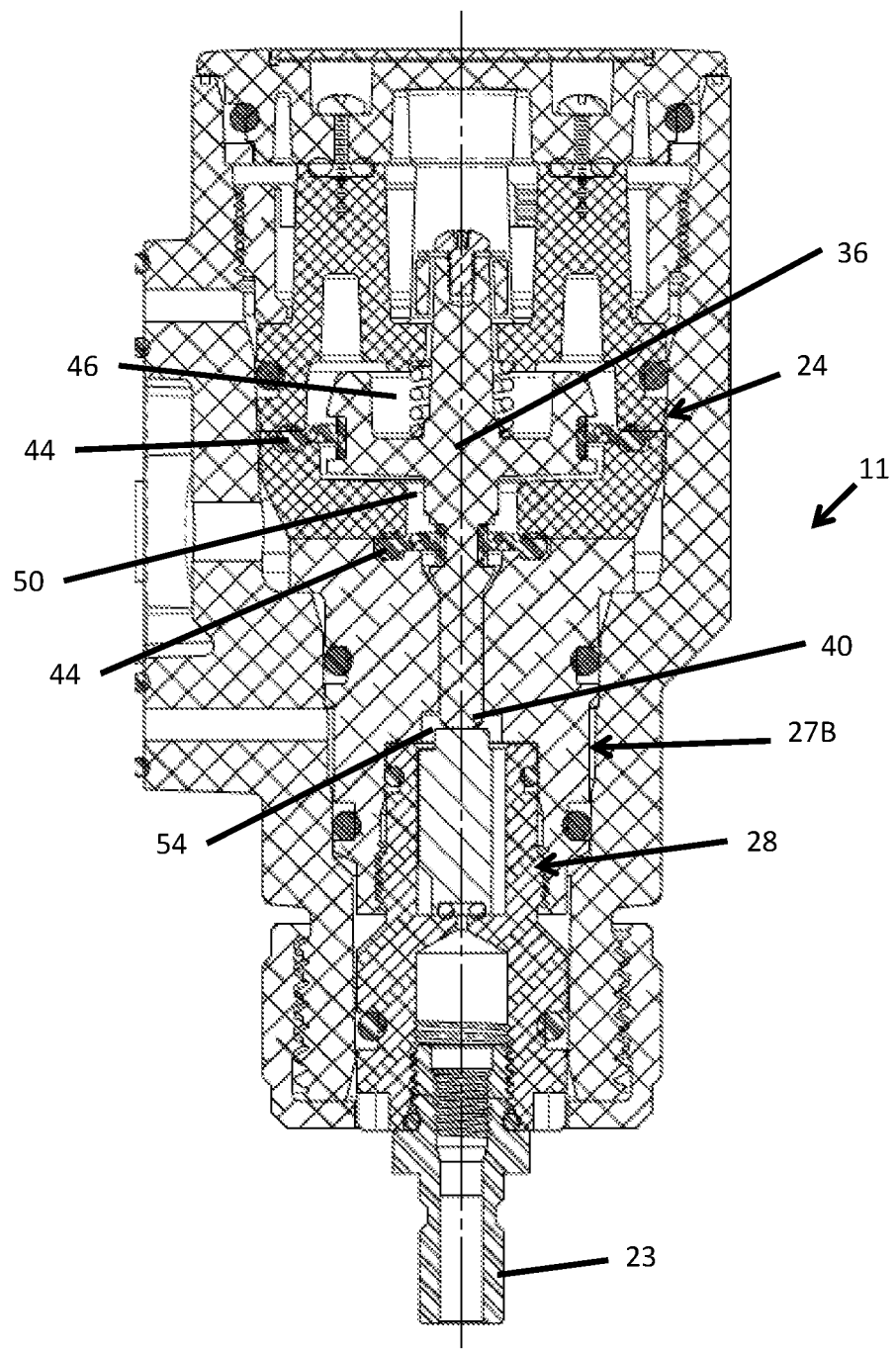
FIG. 5B is an example similar to FIG. 5A except that this depicts an interface for coupling a pressure source that is not self contained such as a dive air tank, according to certain embodiments.

FIG. 5B is an example similar to FIG. 5A except it includes interface portion 27B that is configured for use with a separated pressure source 22 such as a diver air tank (which may be carried on the back of a diver). The example interface portion 27B includes a lower conduit 23 that receives pressurized gas from a separated pressure source (not shown).

Figure 6:
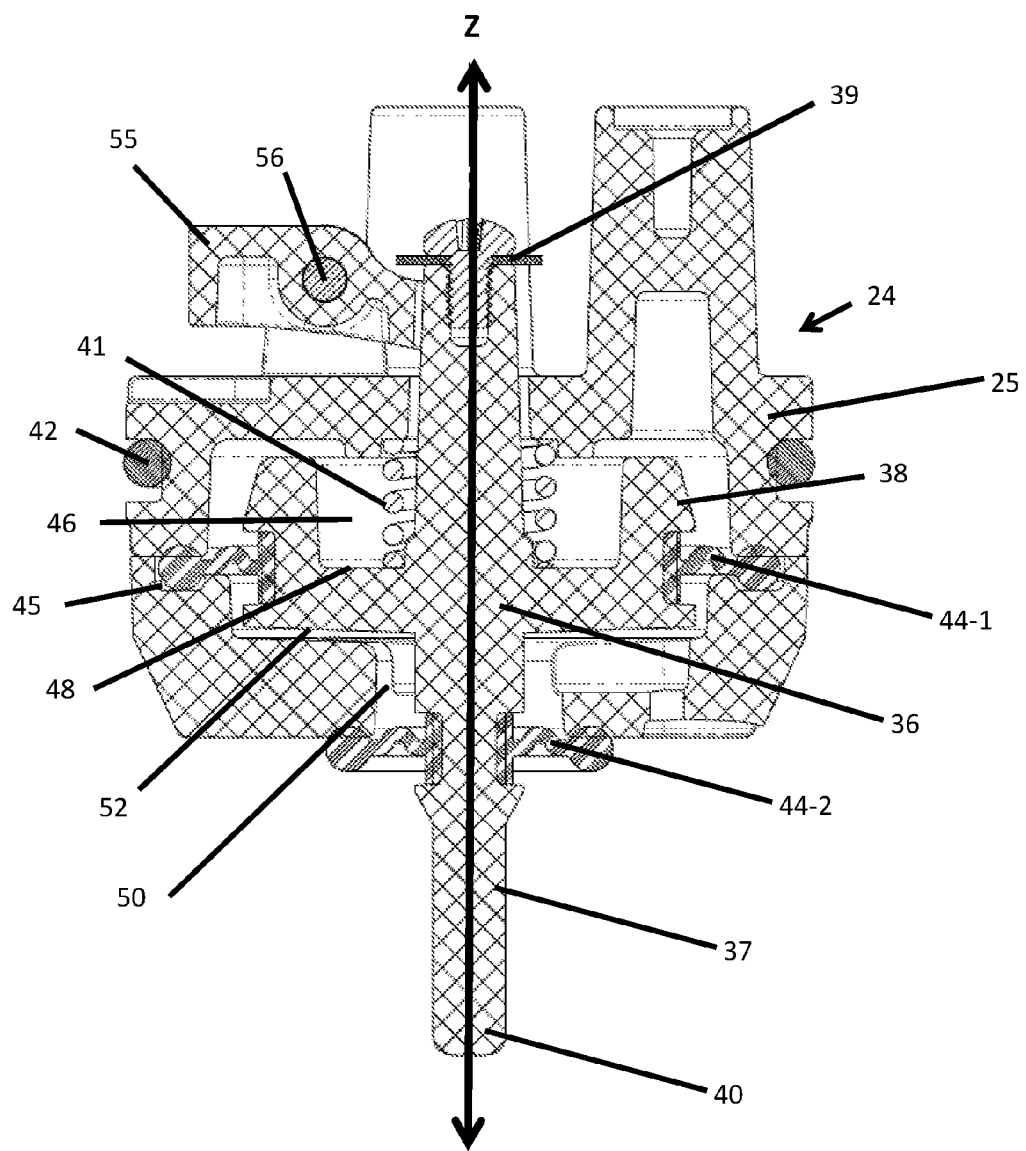
FIG. 6 is an example cross-sectional view illustrating details for a pressure balancing mechanism 24, according to certain embodiments.

FIG. 6 depicts an example portion of pressure balancing mechanism 24 in isolation without valve 28. From earlier examples, balancing module 11 may be balancing mechanism 24 in combination with valve 28 in the example in FIG. 6. In this example, balancing mechanism 24 includes balancing mechanism housing 25, valve actuator member 36, spring 41, flexible diaphragms 44 (shown in FIG. 6 as 44-1 and 44-2), and other elements.

Figure 7A:
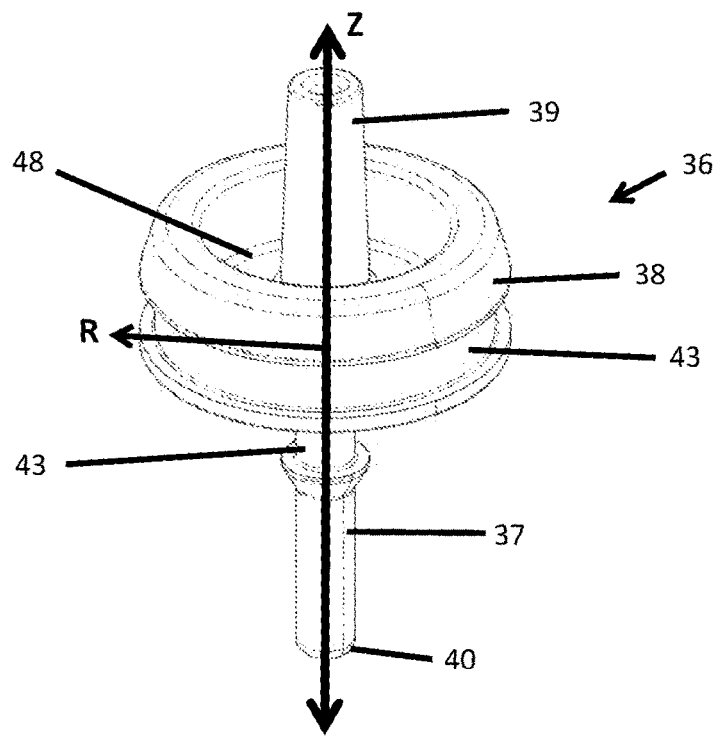
FIG. 7A is an example upper isometric view of a valve actuator member, according to certain embodiments.
Figure 7B:
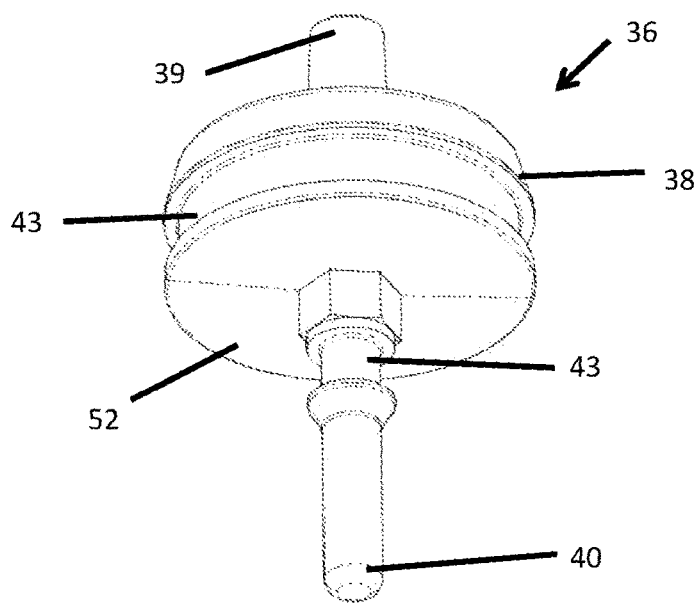
FIG. 7B is an example lower isometric view of a valve actuator member, according to certain embodiments.

Valve actuator member 36 is illustrated in isolation in example FIGS. 7A and 7B. Valve actuator member 36 includes an axial portion 37 that extends along the Z-axis and a radially extending (shown as extending radially along R from axis Z when cylindrical coordinates are used to depict the geometry) pressure receiving portion 38. The valve actuator member may be attached to balancing mechanism housing 25 by two flexible diaphragms 44 (as seen in FIG. 6). One of the diaphragms 44-1 couples pressure receiving portion 38 to balancing mechanism housing 25. Another of the diaphragms 44-2 couples a portion of the axial portion 37 to the balancing mechanism housing 25. Each of the diaphragms 44 are between an open channel 43 formed in valve actuator member 36 and a closed channel 45 formed in housing 25. Such example diaphragms could be made of any number of materials including but not limited to rubber, plastic, or some other material. The diaphragms 44 provide functions of supporting valve actuator member 36 and providing a separation between fluid chambers. The use of rubber diaphragm 44 has an advantage of allowing very low axial net forces (along Z) to deflect valve actuator member 36. This enables a very accurate pressure balance between the enclosure interior 62 and a surrounding water environment.

In the example, a first end 40 of the axial portion 37 may serve as a valve actuating portion 40 of the actuator member 36. A second end 39 of the axial member 36 may be controllably moved by the user manipulated button 14 as will be discussed later.

Spring 41 is disposed between balancing mechanism housing 25 and an upper surface 48 of pressure receiving portion 38. Spring 41 thereby biases valve actuating member 36 downwardly which is in the direction of closing valve 28.

Figure 8:
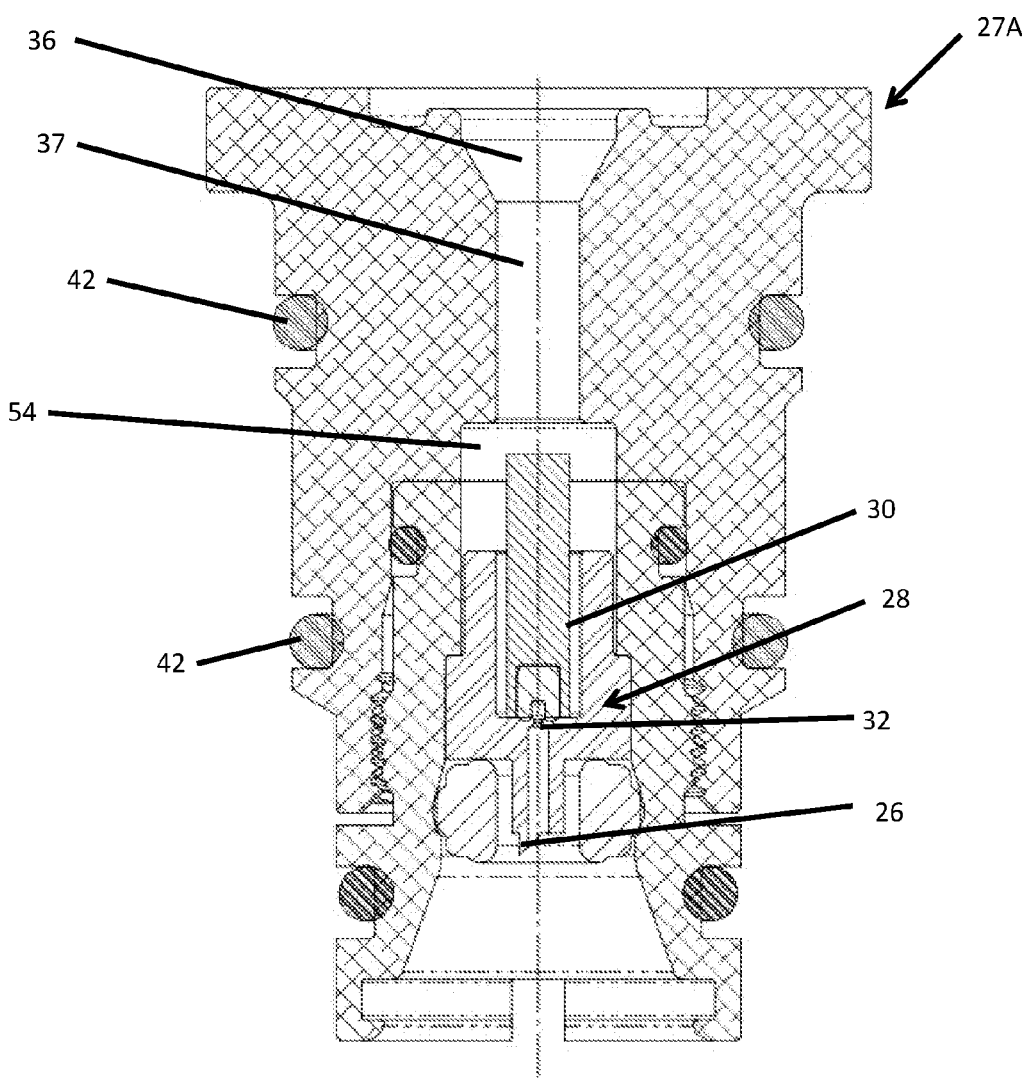
FIG. 8 is an example detailed portion of a cross sectional view taken from FIG. 4B to emphasize a pressure source interface used with pressure cartridge, e.g., a CO2 cartridge, according to certain embodiments.

FIG. 8 depicts an example pressure source interface portion 27A for connecting pressure source (not shown as a self-contained cartridge in this figure) to valve 28. Interface portion 27A includes needle 26 and valve 28. Valve 28 includes valve closing member 30 and valve opening 32. Interface portion 27 defines a passage 35 along the Z-axis that allows actuating portion 40 to extend into passage 35 and engage valve closing member 30.

In FIG. 8, needle 26 is configured to pierce a top portion of $CO_2$ cartridge 22 (FIGS. 4B and 5A) to thereby couple the pressure source to valve 28. Valve 28 controllably separates and couples pressure source to gas coupling port (shown as 16 in FIGS. 4B and 5A above). When valve closing member 30 is pressed against valve opening 32 valve 28 is closed and pressure source 22 is thereby sealed. When valve closing member 30 is released from valve opening 32 valve 28 is open and pressurized gas can thereby pass from pressure source 22, through port 16, and to the interior of enclosure 6.

Figure 9:
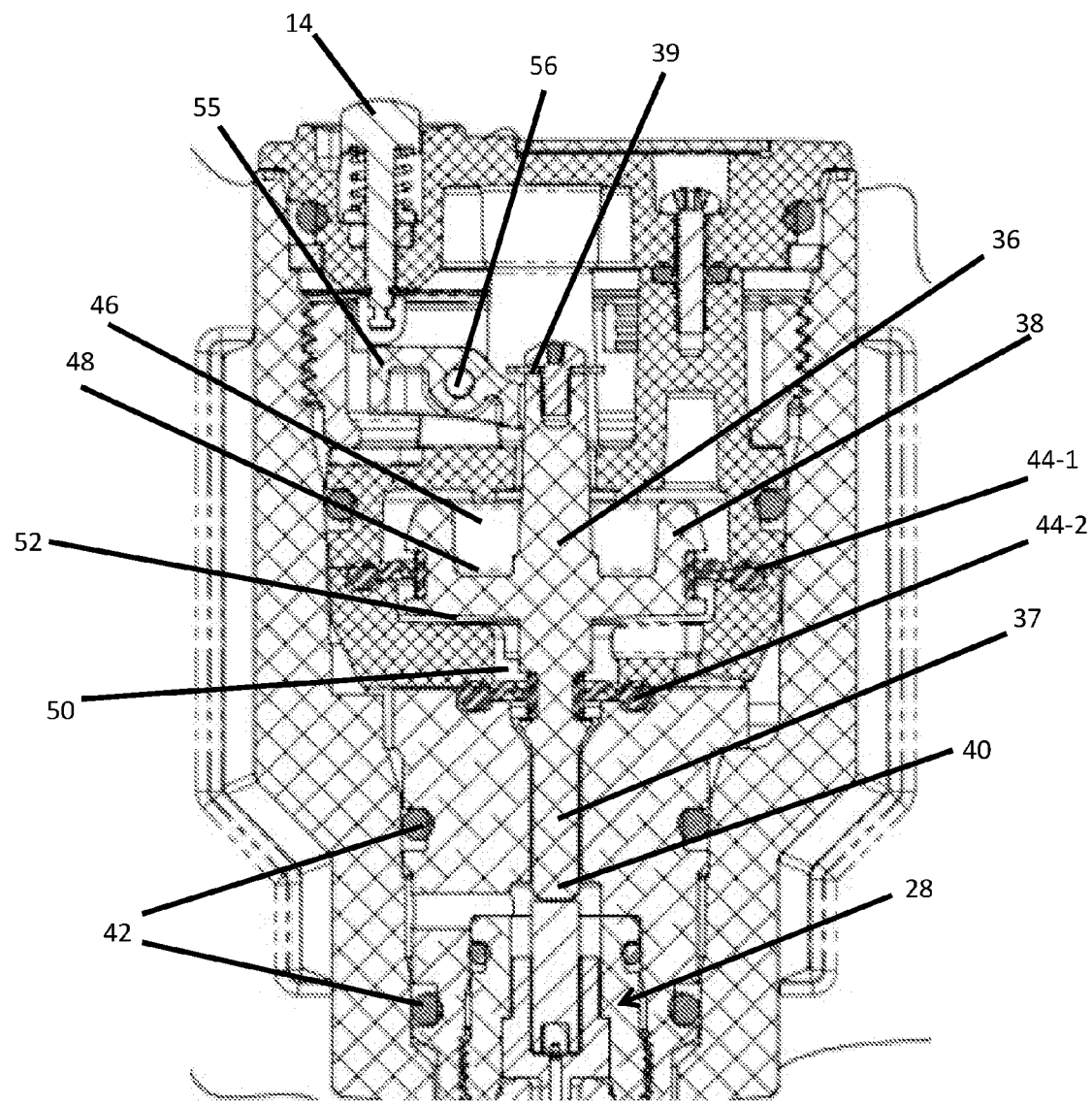
FIG. 9 is an example cross sectional view similar to that of FIG. 5A except that the cross section is taken at a different slice angle to illustrate additional features, according to certain embodiments.

In the examples of FIG. 9, valve 28 is opened and closed by the action of valve actuator member 36. Actuator member 36 includes an axial portion 37 and a pressure receiving portion 38 that extends out radially from axial portion 37. Axial portion 37 includes a valve actuating portion 40 at a first end. Axial portion 37 also includes a second end 39 that extends in a direction opposing the first end 40. During automatic operation of pressure balancing mechanism the valve actuator member 36 receives a vertical force that is the sum of four forces action along the axial direction Z: (1) the downward force of spring (41 in FIG. 6 not pictured in FIG. 9), (2) the downward force resulting from enclosure gas pressure being exerted on upper surface 48 and an upper surface of diaphragm 44-1, (3) an upward force being exerted on lower surface 52 and a lower surface of diaphragm 44-1 by the water environment, and (4) an upward force of gas pressure from pressure source (not pictured). Because of spring (41 in FIG. 6 not pictured in FIG. 9), a sufficient negative differential pressure is required to overcome the spring force and to raise valve actuator member 36 to allow valve 28 to open. Thus the spring partly determines the first predetermined pressure threshold.

User actuated button 14 is described in detail below.

Pressure balancing mechanism 24 has various fluidic chambers that are fluidically separated by O-rings 42 and flexible diaphragms 44. An upper gas chamber 46 within balancing mechanism is in fluidic communication with gas coupling port (16 in FIG. 5A) and with an upper surface 48 of pressure receiving portion 38. Thus the upper surface 48 is in fluid pressure communication with an inside chamber (62 in FIG. 11) of enclosure (6 in FIG. 11). The pressure from within enclosure 6 thereby exerts a downward axial (oriented along Z) force upon upper surface 48 and portions of upper diaphragms 44-1.

A middle fluid chamber 50 is in fluid communication with water inlet (21 in FIG. 5A) and with a lower surface 52 of pressure receiving portion 38. Thus the lower surface 52 and portions of upper diaphragm 44-1 are therefore in fluid pressure communication with the water environment and therefore receives an upward axial force from the water environmental pressure.

The net downward force upon actuator member 36 may therefore be considered the sum of the forces exerted by the (1) spring (41 in FIG. 6) plus the (2) gas pressure exerted upon surface 48 (along with any force transmitted by a connected diaphragm 44) minus the (3) upward force of water exerted upon surface 52 (along with any transmitted diaphragm force) and minus the (4) upward gas pressure force exerted by pressure source (22 in FIG. 5A). When the net downward force becomes negative, the actuator member 36 rises thereby allowing valve 28 to open.

Referring back to FIG. 5A, a lower chamber 54 (in examples FIGS. 5A, 5B, and 8) is in fluid communication with gas coupling port 16 and therefore with enclosure 6 (and therefore with upper chamber 46). When the net downward force along actuator member 36 is positive the lower valve actuation portion 40 bears down upon valve closing member 30 which in turn presses against and seals valve opening 32. Thus the net downward force along actuator member 36 fluidically separates pressure source 22 from lower chamber 54. When actuator member 36 receives a net upward force the lower valve actuating portion 40 raises and allows valve closing member 30 to separate from valve opening 32 thereby opening valve 28. Then pressure source 22 is thereby in fluid communication with lower chamber 54, gas coupling port 16, and enclosure 6. This raises the pressure in enclosure 6.

Still referring to FIG. 5A, raising the pressure in enclosure 6 in also transmits more gas pressure to upper surface 48 which increases the downward axial pressure on actuator member 36 until actuator member closes valve 28. Thus this mechanism provides a closed loop (negative feedback) control of the differential pressure which is the difference between pressure internal to enclosure 6 and the water environment pressure. Because of the action of spring 41 the differential pressure is maintained in a negative state—that is, the pressure within enclosure 6 remains below that of the fluid environment according to the force exerted by spring 41.

In some example embodiments it may be desirable to have a slight positive differential pressure. This is particularly true when the enclosure (6 in FIG. 11) contains a tablet computer for which the user wishes to utilize the touch interface underwater, for example. In such embodiments, there may be a clear membrane that separates surrounding water from the screen of the computer 63 in FIG. 11). With a negative differential pressure the touch interface is non-functional since the membrane presses against the screen.

Figure 10:
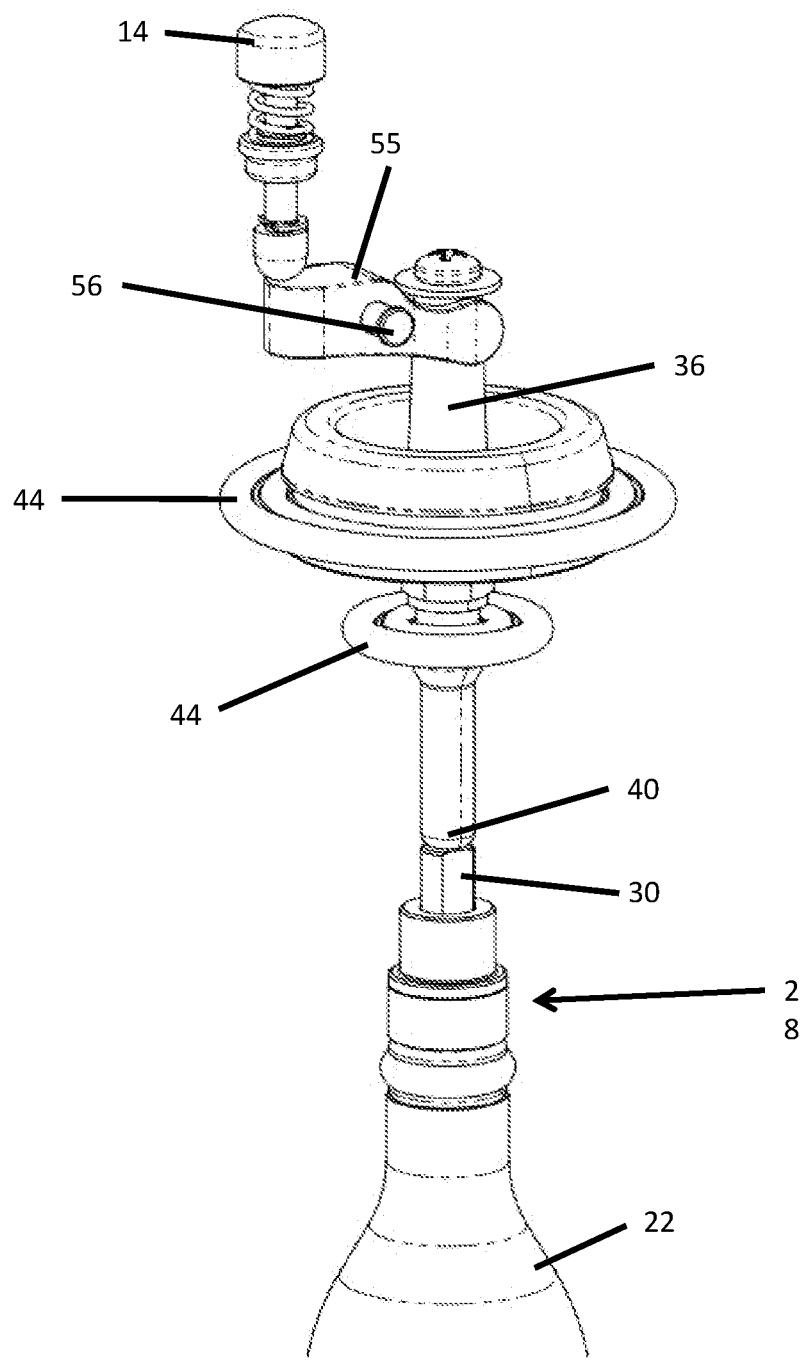
FIG. 10 is an example partial assembly view of a pressure balancing apparatus to illustrate an assemblage of components, according to certain embodiments.

FIG. 10 depicts certain working components in partial isolation for simplicity. A user manipulated button 14 enables the user to release pressure from pressure source 22 to within enclosure 6. Pressing on button 14 is configured, when actuated, to pivot rocker arm 55 about pivot point 56. Rocker arm 56 engages upper portion 39 of actuator member 36 and lifts valve actuator member 36 in response. (See also FIG. 6). This opens valve 28 and allows pressure source 22 to pressurize the interior region of enclosure 6. The pressurization is limited by the cracking pressure of check valves 20.

Figure 11:
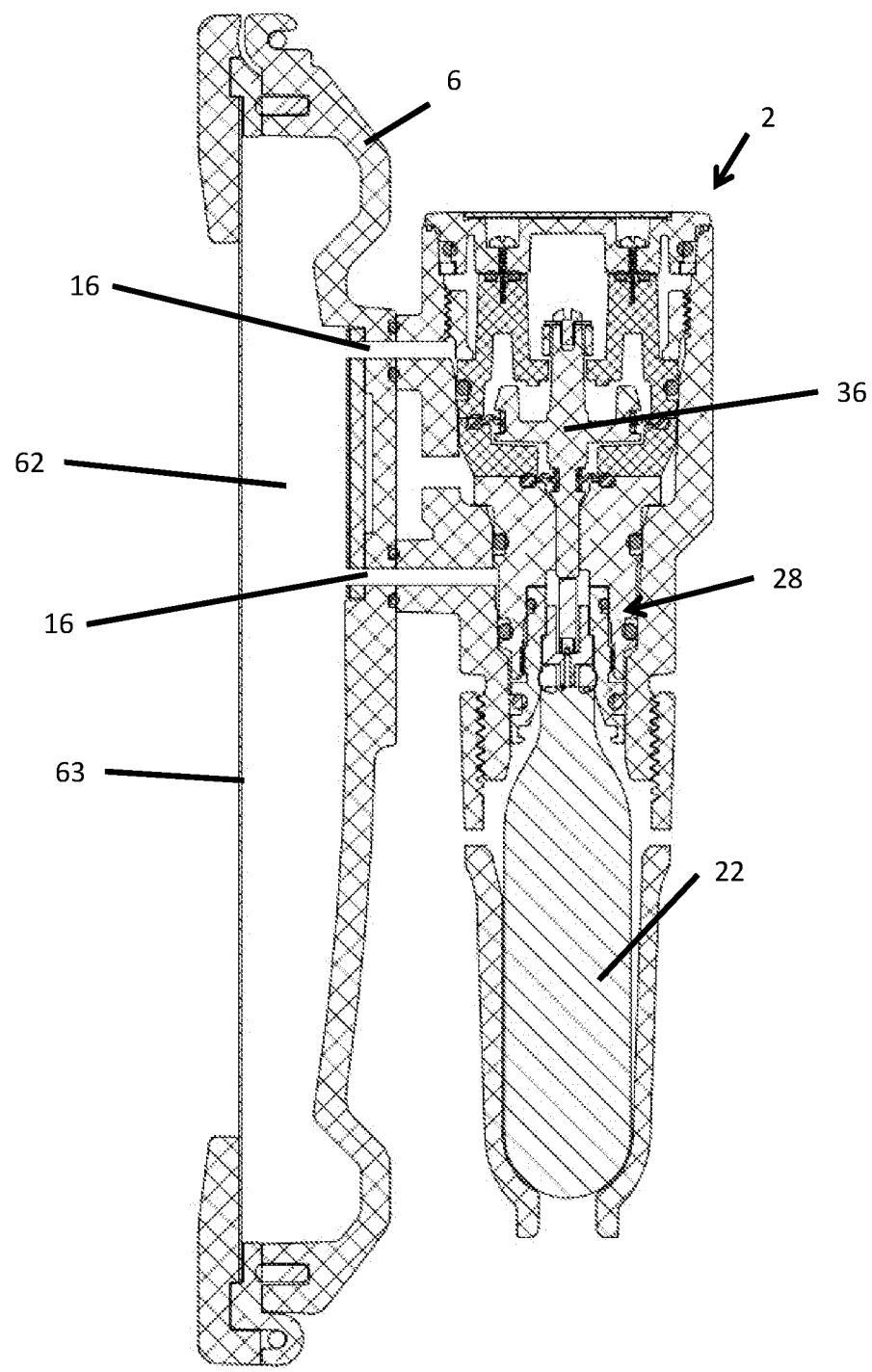
FIG. 11 is an example cross sectional view of a pressure balancing apparatus 2 attached to an enclosure 6, according to certain embodiments.

FIG. 11 depicts an exemplary pressure regulating apparatus 2 attached to an enclosure 6 as described throughout this document. As described above, enclosure 6 may be configured to protect and enable underwater use of, for example, any device including but not limited to electronics such as a tablet computer. Pressure regulating apparatus 2 controls the differential pressure between enclosure chamber 62 and the surrounding water environment. In the illustrated example, a membrane 63 covers a tablet computer touch screen (not shown). A positive differential pressure (between chamber 62 and the water environment) is required in order for the touch screen 63 to be functional.

Figure 12:
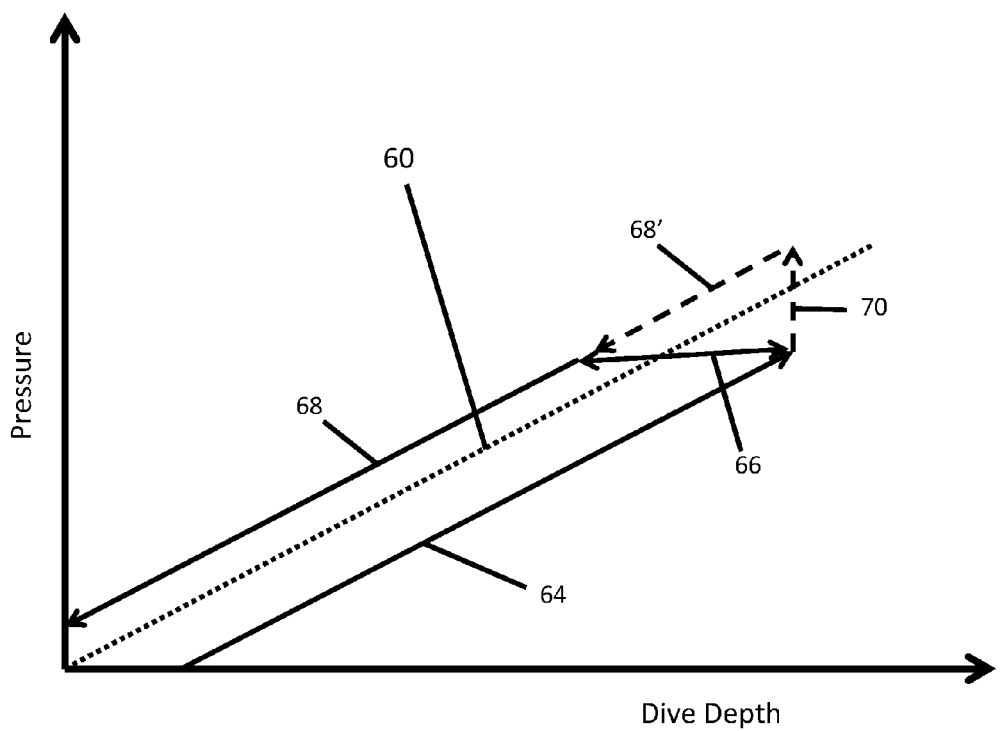
FIG. 12 is an example graphical pressure versus depth representation of the operation of a pressure balancing apparatus 2, according to certain embodiments.

FIG. 12 depicts an example of the operation of pressure balancing apparatus 2 during a diving sequence including a descent and ascent. The dotted line 60 represents a surrounding water environment pressure versus dive depth. The arrow segments 64, 66, and 68 represent pressures in enclosure 6 during portions of a dive including a descent (arrow 64) and ascent (arrows 66 and 68). Dashed arrows 70 and 68' represent portions of an alternative dive sequence. An actual dive may be much more complicated than the illustrated sequence which is simplified to in order to illustrate operation of pressure balancing apparatus 2.

A first dive sequence will now be described according to arrow segments 64, 66, and 68. This sequence represents use of a pressure balancing apparatus 2 that does not necessarily include a device that enables a manual opening of balancing module valve 28 such as button 14 (from FIG. 9). As a diver descends the pressure balancing mechanism 24 opens and closes valve 28 to maintain a pressure in enclosure 6 to generally follow arrow 64. The differential pressure is represented by values along the arrow 64 minus values along dashed line 60 which is negative. This is further explained by the following:

As the depth increases (along arrow segment 64) the water pressure applied to fluid inlet 21 increases. This water pressure, being applied to surface 52 overcomes the force of spring 41 (see FIGS. 5A and 6 for example). This causes actuator member 36 to rise and to thereby open valve 28 which in turn allows pressure source 22 to pressurize enclosure 6. As a pressure in an interior portion 62 (FIG. 10) rises it presses upon surface 48 which overcomes the water pressure and causes valve actuator member 36 to bear down upon valve 28, closing valve 28. In this way valve 28 is opened and closed as the depth increases and regulates the pressure along line segment 64 of FIG. 11. During the descent 64 the pressure balancing mechanism 24 maintains the differential pressure above a first predetermined threshold which is negative during the descent due to the force exerted by spring 41. This negative differential pressure is represented in FIG. 12 by the distance at which arrow segment 64 is below dashed line 60. The regulator 20 (e.g., poppet valve 20 or check valve 20) remains closed during descent 64. As a note, the actual pressure along arrow 64 would tend to fluctuate as a result of the opening and closing of valve 28 depending upon the geometry of the valve and other factors and thus the actual pressure in enclosure 6 would tend to undershoot and overshoot arrow 64. Pressure fluctuations as a result of regulator operation is not shown for simplicity for segments 64 and 68.

After reaching a certain depth the diver begins an ascent. Arrow segment 66 represents a relatively constant pressure within enclosure 6 during an initial part of the ascent. During segment 66 the differential pressure is rising above the first threshold (at which the balancing mechanism 24 opens valve 28) but has not yet reached the second threshold. Note while arrow 66 is drawn from right to left (toward decreasing depth) this is reversible. The diver can swim up and down within this range without the module valve 28 or regulator valve 20 opening because the differential pressure is between the first and second predetermined pressure thresholds.

As the diver continues to ascend, the differential pressure reaches the second predetermined threshold at which the regulator valve 20 opens. This continued ascent is represented by the arrow segment 68. The positive differential pressure is represented in FIG. 12 by the distance that arrow segment 68 is above dashed line 60. The module valve 28 remains closed during ascent 68.

An alternative dive sequence is represented by arrows 64 and 68 along with dashed arrows 70 and 68'. This is a possible sequence for a pressure balancing apparatus 2 that includes a means for a diver to manually open module valve 28 such as with the user manipulated button 14. The dive decent arrow 64 is essentially the same as described earlier with the negative differential pressure maintained at or near a first predetermined pressure value.

When the diver reaches a certain depth, the diver may decide to increase the differential pressure to a positive value. By pressing button 14 (FIGS. 9 and 10) at a constant depth, the diver can increase the pressure of gas in interior space 62 as indicated by segment 70 of FIG. 12. Pressing button 14 releases pressurized gas into interior space 62 until the cracking pressure of check valves 20 (regulator 20) is reached whose cracking pressure defines the maximum positive differential pressure between interior space 62 and the water pressure.

When the diver begins to ascend, the differential pressure is maintained at the second predetermined pressure value as indicated by arrow segments 68' and 68 as discussed earlier. To summarize the variables involved, the differential pressure is represented by the vertical distance between each arrow segment (representing pressure within enclosure 6) and the dotted line (representing surrounding water pressure). The differential pressure equals or tracks a negative first predetermined pressure value along segment 64 which is regulated by the action of balancing mechanism 24 opening and closing module valve 28 while regulator valve 20 remains closed. The differential pressure equals or tracks a positive second predetermined pressure value along segment 68 (and alternatively also along segment 68') by the action of regulator valve 20 opening and closing while module valve 28 remains closed. As indicated earlier the actual pressure would not be a straight arrow but would be a wavy line whose waviness is a function of valve geometry, valve "stickiness," a rate of ascent and possibly other factors.

Conclusion

The specific embodiments and applications thereof described above are for illustrative purposes only and do not preclude modifications and variations encompassed by the scope of the following claims.

It should be noted that in this description, directional terms such as "upper," "lower," "upward," "downward," "vertical," or "horizontal" may be intended to describe relative positions of components and/or relative directions but not to indicate absolute positioning relative to a gravitational reference frame unless otherwise indicated. In this description "pressure communication" between two regions or surfaces may refer to either a direct fluidic connection or to having the same "static pressure" ignoring the effect of gravity. The term "static pressure" may refer to a pressure state in which all valves are closed and therefore a condition of static equilibrium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more targets, that word covers all of the following interpretations of the word: any of the targets in the list, all of the targets in the list and any combination of the targets in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A pressure balancing apparatus comprising:
   a waterproof enclosure having walls surrounding an interior chamber,
   a mounting interface mounted to the enclosure with a port to an outside; and
   a balancing module, connected to the mounting interface, the balancing module including,
      a balancing module housing;
      a valve actuator member inside the balancing module housing, with a receptacle for a pressure source, and with a spring mounted pressure surface,
         wherein the valve actuator member is configured to move in response to changes in differential pressure between a pressure in the enclosure chamber and pressure from the outside as exerted on the spring mounted pressure surface; and
      a module valve, inside the balancing module housing, connected to the valve actuator member, and fluidically separating the enclosure chamber from the port to the outside,
         wherein the module valve includes an axial portion with two flexible diaphragms and is configured to open and close in response to the movement of the valve actuator member, to maintain a pressure between a first and a second predetermined pressure threshold, the first predetermined threshold determined by a spring on the spring mounted pressure surface;
      a pressure source housing, removably mounted to the balancing module housing by a threaded mount, and
      a button assembly including a button and a pivot rocker arm, the pivot rocker arm in communication with the valve actuator member and configured to lift the valve actuator member when depressed to allow the pressure source in the pressure source housing to pressurize the waterproof enclosure.

2. The apparatus of claim 1 further comprising a pressure regulator connected to the mounting interface, the pressure regulator configured to,
   open when pressure in the outside drops, and
   close when pressure in the outside increases.

3. The apparatus of claim 1 wherein the mounting interface includes a gas coupling conduit between the balancing module and the waterproof enclosure interior chamber.

4. The apparatus of claim 1 wherein the receptacle for the pressure source is a gas coupling conduit with a valve assembly between the enclosure interior chamber and the pressure source.

5. The apparatus of claim 2 wherein the pressure source is a carbon dioxide cartridge.

6. The apparatus of claim 1 wherein one wall includes a clear membrane.

7. A method of pressure balancing comprising:
   enclosing an interior chamber with walls surrounding a waterproof enclosure,
   mounting an interface to the enclosure, the interface including a port to an outside; and
   connecting a balancing module housing to the mounting interface;
   moving a valve actuator member inside the balancing module housing in response to changes in differential pressure between a pressure in the enclosure chamber and pressure in the outside,
   moving a spring mounted pressure surface in communication with the valve actuator member, to maintain a pressure between a first and a second predetermined pressure threshold, the first predetermined threshold determined by the spring on the spring mounted pressure surface;
      wherein the valve actuator member includes a receptacle for a pressure source;
   fluidically separating the waterproof enclosure chamber from the port to the outside, via a module valve with an axial portion and two flexible diaphragms, the module valve being inside the balancing module housing and connected to the valve actuator member;
   opening and closing the module valve in response to the movement of the valve actuator member
   connecting a removable pressure source housing, to the balancing module housing by a threaded mount.

8. The method of claim 7 further comprising, via a pressure regulator connected to the mounting interface,
   opening the regulator when the outside pressure drops, and
   closing the regulator when the outside pressure increases.

9. The method of claim 7 wherein the mounting interface includes a gas coupling conduit between the balancing module and the waterproof enclosure interior chamber.

10. The method of claim 7 wherein the receptacle for the pressure source is a gas coupling conduit with a valve assembly between the enclosure interior chamber and the pressure source.

11. The method of claim 8 wherein the pressure source is at least one of a carbon dioxide cartridge and an external dive tank.

12. The method of claim 7 wherein one wall includes a clear membrane.

13. A pressure balancing apparatus comprising:
   a balancing mechanism housing and a valve actuator member;
      the balancing mechanism housing including a closed channel, and
      the valve actuator member, including an axial portion having a first end and a second end, and, a radially extending pressure receiving portion with an open radial channel;

wherein the first end of the axial portion is a valve actuator; and wherein the second end of the axial portion is in communication with a button;

wherein the valve actuator member includes a first and a second flexible diaphragm, and is attached to the balancing mechanism housing via the first and the second flexible diaphragm, the first flexible diaphragm couples the pressure receiving portion open radial channel to the balancing mechanism housing; and the second flexible diaphragm couples the axial portion to the balancing mechanism housing; and a spring between the balancing mechanism housing and the pressure receiving portion biasing the valve actuating member toward the first end of the axial portion;

a pressure source housing, removably mounted to the balancing module housing by a threaded mount;

a button assembly including the button and a pivot rocker arm, the pivot rocker arm in communication with the valve actuator member and configured to lift the valve actuator member when depressed to allow the pressure source in the pressure source housing to pressurize the waterproof enclosure.

14. The apparatus of claim 13 wherein the first and second diaphragms are made of at least one of, rubber and plastic.

15. The apparatus of claim 13 further comprising, a waterproof enclosure having walls surrounding an interior chamber, wherein one wall includes a clear membrane; and a mounting interface mounted to the enclosure with a port to an outside, wherein the balancing mechanism is inside a balancing module connected to the mounting interface.

16. The apparatus of claim 15 wherein, the balancing module includes a receptacle for a pressure source.

17. The apparatus of claim 16 wherein, the valve actuator member is configured to move in response to changes in differential pressure between a pressure in the enclosure chamber and pressure from the outside.

18. The apparatus of claim 17 further comprising, a module valve configured to open and close in response to the movement of the valve actuator member.

* * * * *